United States Patent [19]

Naron et al.

[11] Patent Number: 4,807,224

[45] Date of Patent: Feb. 21, 1989

[54] MULTICAST DATA DISTRIBUTION SYSTEM AND METHOD

[76] Inventors: Steven E. Naron, 9909 Sorrel Ave., Potomac, Md. 20854; John M. Branan, 404 Suffield Dr., Gaithersburg, Md. 20878; Gerald A. Marin, 12528 War Admiral Way, Darnestown, Md. 20878

[21] Appl. No.: 87,850

[22] Filed: Aug. 21, 1987

[51] Int. Cl.[4] .......................... H04J 3/24; G08C 25/02; H04L 1/00
[52] U.S. Cl. ......................................... 370/94; 371/32
[58] Field of Search .................... 370/94, 85, 160, 86, 370/88, 13, 94 U; 371/33, 32

[56] References Cited

U.S. PATENT DOCUMENTS

| | | |
|---|---|---|
| 3,387,268 | 6/1968 | Epstein . |
| 3,587,044 | 7/1969 | Jenkins . |
| 4,276,594 | 6/1981 | Morley . |
| 4,317,957 | 3/1982 | Sendrow . |
| 4,325,120 | 4/1982 | Colley et al. . |
| 4,354,225 | 10/1982 | Frieder et al. . |
| 4,418,384 | 11/1983 | Holtey et al. . |
| 4,454,508 | 6/1984 | Grow . |
| 4,459,588 | 7/1984 | Grow . |
| 4,538,147 | 8/1985 | Grow . |
| 4,569,015 | 2/1986 | Dolev et al. . |
| 4,569,042 | 2/1986 | Larson . |
| 4,587,650 | 5/1986 | Bell . |
| 4,617,657 | 10/1986 | Drynan et al. ........................ 370/60 |
| 4,644,542 | 2/1987 | Aghili et al. . |
| 4,661,952 | 4/1987 | von Sichart et al. . |
| 4,663,748 | 5/1987 | Karbowiak et al. . |
| 4,725,834 | 2/1988 | Chang et al. ......................... 370/85 |

*Primary Examiner*—Robert L. Griffin
*Assistant Examiner*—Wellington Chin

[57] ABSTRACT

A data distribution system and method for the timely, efficient and reliable distribution of data to an unlimited number of remote receiver installations. A data source assembles data packets, and upon filing or after the lapse of a predetermined interval of time, broadcasts a respective data packet to all receivers and recovery means along a communication network. Each receiver is intelligent, in that it copies the data packets into a buffer and has the responsibility of selecting out data needed to perform the receiver's intended functions. As a result, intermediate data selecting and routing means between the data source and receivers are avoided, resulting in data delivery which is both rapid and timely. For reliability, each receiver monitors the sequence numbers of the data packets which have been received and, also, whether a data packet is received at least as frequently as the predetermined interval of time. Any data packet which a receiver determines is missing, can be obtained from the recovery means which stores a library of the received data packets or which can retrieve the missing data packet from the data source.

35 Claims, 8 Drawing Sheets

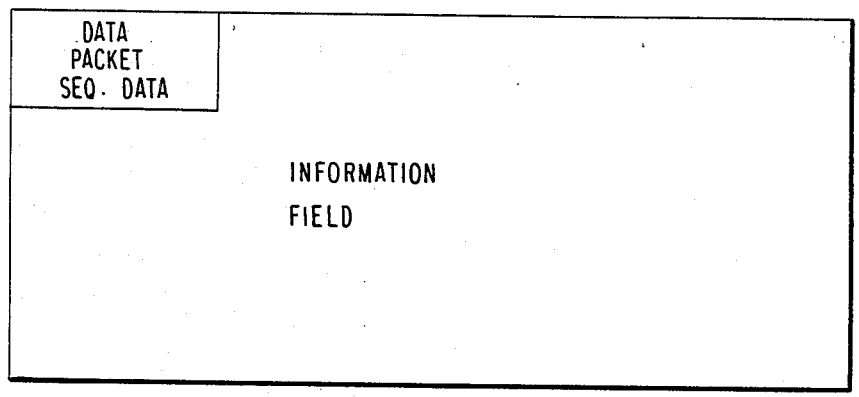

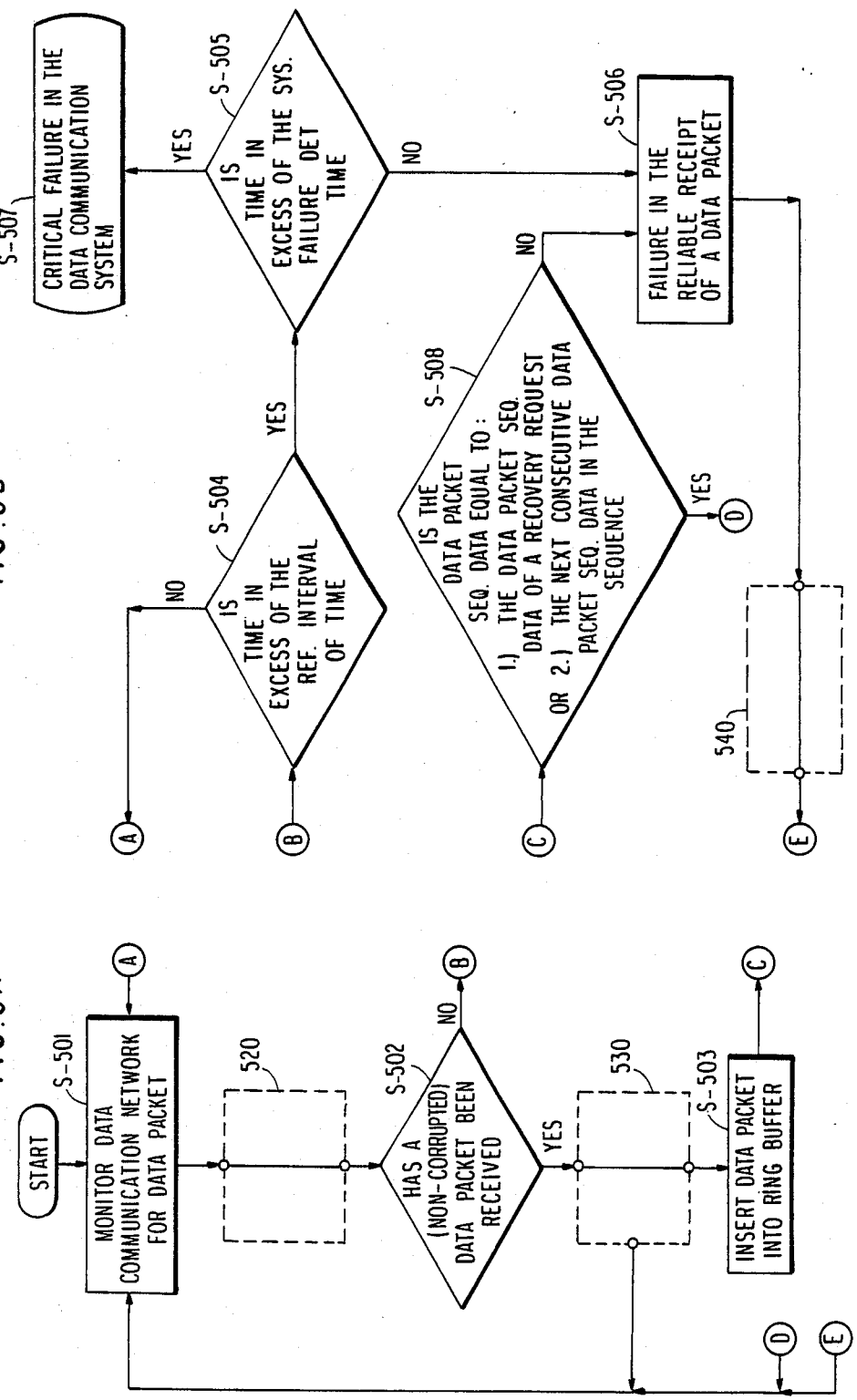

MULTICAST DATA DISTRIBUTION SYSTEM AND METHOD

TECHNICAL FIELD

The present invention relates to a Multicast Data Distribution System (MDDS) and method and, more particularly, to a data distribution system and method for the timely, efficient, and reliable distribution of data to an unlimited number of remote receivers.

BACKGROUND ART

Numerous data communication systems have been proposed for a wide variety of different applications, for example:

U.S. Pat. No. 4,317,957, issued to Sendrow on Mar. 2, 1982, discloses a system for protecting transactions and providing authentication of users in an on-line system for automatic tellers. A Personal Identification Number (PIN) which is concatenated with an anti-counterfeiting code, a Personal Identification Number (PIN) and a time stamp are used to validate automatic teller transactions.

U.S. Pat. Nos. 4,454,508 and 4,459,588, issued to Grow on June 12, 1984 and July 10, 1984, respectively, disclose timed token ring protocols. Any station can transmit information upon the receipt of the token if the time since the previous receipt of a write token is less than the unused amount of capacity left on the ring.

U.S. Pat. No. 4,569,042, issued to Larson on Feb. 4, 1986, discloses a data packet switching network in which continuity packets bearing time stamps are employed to determine call path transit time delay.

U.S. Pat. No. 3,587,044, issued to Jenkis on June 22, 1971, discloses a system for the transfer of digital communication data through a communication medium having a significant delay. The disclosed system has means for interlocking the data transfers to assure accurate data transmission and receipt.

U.S. Pat. No. 4,538,147, issued to Grow on Aug. 27, 1985, discloses a method of allocating available bandwidth between a plurality of stations which are configured in a write-controlled loop communication network.

U.S. Pat. No. 4,587,650, issued to Bell on May 6, 1987, discloses a method of simultaneously transmitting isochronous and non-isochronous data on a local area network through the use of a unique signal pattern.

U.S. Pat. No. 4,661,952, issued to von Sichart et al on Apr. 28, 1987, discloses a method of transmitting data on a telecommunications exchange via a ring line system which allows information items to be transmitted in periodically recurring pulse frames.

U.S. Pat. No. 4,663,748, issued to Karbowiak et al on May 5, 1987, discloses a communication system suitable for use as a local are network (LAN). The Karbowiak et al system has a network comprised of a plurality of nodes such that the system is capable of reconfiguring itself after node failure to minimize system disruption.

U.S. Pat. No. 3,387,268, issued to Epstein on June 4, 1968, discloses remotely locatable apparatus which receives a continuous stream of coded alpha numeric data from a central station for the monitoring of stock trading transactions.

U.S. Pat. No. 4,644,542, issued to Aghili et al on Feb. 17, 1987, discloses a method for the reliable broadcasting of information in a distributed network, such that, despite the presence of faulty processors in the system, the fault-free processors of the system can still obtain consistent views of the information which is available on the system.

U.S. Pat. No. 4,569,015, issued to Dolev et al on Feb. 4, 1986, discloses a method for reliably achieving agreement between multiple processors, by having each processor add a distinctive unforgeable signature to a message contents as the message is passed on.

U.S. Pat. No. 4,418,384, issued to Holtey et al on Nov. 29, 1983, discloses a communication subsystem which automatically aborts a sequence of bits when the subsystem senses that it is not receiving data from a microprocessor fast enough to maintain synchronous transmission over the communication line.

U.S. Pat. No. 4,325,120, issued to Colley et al on Apr. 13, 1982, discloses an elaborate data processing system which has processors which recognize two basic types of objects (i.e., an object being defined as a representation of related information maintained in contiguously-addressed set of memory locations). The first type of object contains ordinary data, while the second type of object contains information for locating and defining the extent of access to object associated with that access descriptor.

U.S. Pat. No. 4,354,225, issued to Friedler et al on Oct. 12, 1982 discloses a data processing system having a plurality of intercoupled processors working in conjunction with an intelligent main memory system.

U.S. Pat. No. 4,276,594, issued to Morley on June 30, 1981, discloses an elaborate digital computer and associated method steps.

In the world of data communications, there exists a need for generic data communication system and method having the ability to simultaneously satisfy a number of important requirements which are critical in many data communication applications. More particularly, there often exists a need for a data communication system which can provide for the regular and very high performance delivery of updated data to an unlimited number of receiver installations. In many of these environments, respective receivers are not interested in all the data which is available but, instead, are interested only in selected data needed to perform the receiver's intended function. Furthermore, it is often highly critical that the data delivery be reliable, and that the data communication system have a facility which can provide a data guarantee. A number of different approaches, which attempt to provide the above requirements, are discussed below.

More particularly, there are several data communication approaches which have been used to provide selected data to selected receivers.

In a first approach, the delivery of selected data to selected receivers is performed by the data transmission device or by an intermediate device at some intermediate point along the communication network. More particularly, in implementing such an approach, a data source device or communication node device would apply data management routines to the raw body of data, and then selectively channel data to respective receivers along the communications network. The selective channeling of the selected data can be performed using either time-multiplexing by dividing the available broadcast time of the communication network, or space-multiplexing by dividing the communication network into respective communication links.

Such an approach was found to be disadvantageous in terms of data delay, because respective portions of the data delivery device (i.e., data source or communication node device) operating time must be dedicated solely to satisfying the need to select data for the respective receivers. Rather than obtaining swift receipt of the data from the data collection point, each respective receiver has to wait in turn while the delivery device performs a number of data management and selective channeling routines. In effect, it can be seen that each respective receiver suffers a cumulative data delay penalty due to other receivers on the system. As the number of respective receivers which a delivery device has to service increases, data delay increases proportionally.

In a second approach, the selective delivery of data is provided by an intermediate file server which serves as a data library by receiving data transmissions from a data source and maintaining updated tables of data. The respective receivers must make individual queries to the file server as to the data of interest. The file server handles queries in the order of receipt by checking the status of the selected data in question, and forwarding the status to the requesting receiver.

This second approach has also been found to induce data delay for reasons which are similar to the above. A respective portion of file server operating time must be dedicated solely to the answering of each individual request. Rather than obtaining swift receipt of the select data, each respective receiver must wait in turn for the answer to its request. As the number of queries handled by a file server increases, data delay increases proportionally.

In analyzing the above two approaches, it can be seen that each of the receivers suffers a data delay penalty due to the presence of other devices on the data communication system. More particularly, it can be seen that a tremendous amount of delay time suffered by each receiver is caused by time used to selectively manage, channel, or answer the data requests of the other receivers.

Turning now to providing a data guarantee requirement in a data communication system, there are several approaches which can be used to check whether all data has been received by a receiver.

One approach is to have each receiver, upon receipt of data from the data source, send an acknowledgement back to the data source. The data source monitors the acknowledgements from the respective receivers, and in the event of a failure, retransmits the data to the respective receiver or otherwise informs the receiver of the data failure. This approach is disadvantageous in several respects.

First, important communication medium resources (i.e., transmission bandwidth or transmission time) are being absorbed through the use of the communication medium to send acknowledgements, and/or to transmit a duplicate copy of the failed data or a data failure warning. Rather than being able to devote a maximum amount of the communication medium resources to support a continuous transmission of updated data, a percentage must be dedicated to the acknowledgement mechanism. As the number of respective receivers sending acknowledgements increases, more and more of the communication medium is used, resulting in a proportional increase in data delay.

A second and more important disadvantage using the acknowledgement scheme is that each receiver performs only an echo function (i.e., echoing an acknowledgement of receipt to the data source), and does not participate in the determination of a failure in the data receipt. In the event of an interruption which disturbs data delivery, a receive will continue to operate on the assumption that it has received the most recent data, until such a time when the data source informs it otherwise. If a failure in the communication link has isolated the receiver from the data source, the notification of a failure from the data source will never arrive.

Another approach which can be used to provide data guarantee is to perform some sort of data comparison which can be performed at at least two different locations, i.e., at the the point of data transmission or the point of data receipt.

If the comparison is to be performed at the point of data transmission, each receiver must echo the data back to the data source in a manner similar to the acknowledgement routine. Although this method provides a higher degree of data guarantee than echoing just an acknowledgement (i.e., via a one-to-one data comparison), this approach is still deficient in the same manner as the acknowledgement routine.

The arrangement of having a data comparison performed at the point of receipt provides advantages over the above approach.

In utilizing this type of arrangement, the communications system must incorporate some sort of routine whereby each receiver is able to obtain two independent copies of the data which can be compared. This can be accomplished by the simultaneous transmission of the data along parallel communication paths or repeated transmissions of the data along a single communication path. Although each of the receivers is now able to make a determination of a data failure at the time it occurs thus participating in the data guarantee routine, this approach also has disadvantages.

More specifically, the use of parallel paths to provide dual copies of the data is disadvantageous, because a dual expenditure is incurred in the development and maintenance of two communication paths. The use of repeated transmissions to provide dual copies is disadvantageous because transmission medium resources (i.e., transmission bandwidth or transmission time) are absorbed by the retransmission process. As described above, this prevents maximum use of transmission resources to support a continuous transmission of updated data, thus resulting in data delay. In addition to the above disadvantages, both arrangements have a more important disadvantage, in that, if there is a long-term failure in the single transmission path used with a retransmission approach, or if there are simultaneous failures in the parallel transmission paths used in a parallel transmission approach, the isolated receiver will not receive either copy of the data and, hence, will not know that data has been missed.

In many data communication systems, the data source means is heavily involved in the data recovery process. In these types of systems, an individual receiver with missing data initiates a direct communication with the data source along the data communication network in order to request a copy of any data which has been missed. In order for the data source to provide the data guarantee, the data source then must retransmit the data along the data communication network. Such an approach has a major disadvantage.

More specifically, important communication medium resources (i.e., transmission bandwidth or transmission time) are being absorbed by the use of the communications medium to provide the data guarantee. Rather than being able to devote a maximum amount of the medium resources to support a continuous transmission of updated data, a percentage of the resources must be dedicated to the data guarantee. As the number of occurrences of data recovery increases, more and more of the communications medium is used, resulting in a proportional increase in data delay.

Because of the above disadvantages and shortcomings, there still exists a need for a system and method which provide for the widespread, timely and reliable distribution of data to an unlimited number of remote receiver installations, while at the same time, providing for the delivery of data with minimum delay, and for an arrangement whereby the reliable receipt of data at each receiver installation can be guaranteed.

SUMMARY OF THE INVENTION

The present invention provides a unique data communication system and method to satisfy the aforementioned needs.

More particularly, the present invention provides a data communication system and method where data is centrally assembled into data packets by a data source. Each data packet contains data corresponding to a data packet sequencing number, and an information field. Respective data packets are broadcast immediately if they become full, or if not full, are broadcast after the lapse of a predetermined interval of time. An unlimited number of remote receivers can be configured anywhere along the data communications network to receive the broadcast data packets. The combination of having each data packet contain a data packet sequencing number and being broadcast at at least a minimum frequency defined by the predetermined interval of time, leads to a data communication system and method where data reliability can be guaranteed. Each receiver contains failure detection means for checking for the reliable receipt of data by monitoring the data packet sequence numbers and for the receipt of a respective data packet at at least a minimum frequency defined by the predetermined interval of time. If it is also desired to provide a receiver with the ability to recover missing data, recovery means are included for supplying a data packet to a receiver which issues a request for such in response to a determination that there was a failure in the reliable receipt of that data packet.

Thus, it is an important object of the present invention to provide a data communication system and method which provide for the widespread and reliable distribution of data to an unlimited number of remote receiver installations.

A further object is to provide that the widespread distribution of data be swift, minimize bandwidth utilization, and that minimum data delay be introduced in the data distribution.

An additional object of the present invention is to provide a data communication system that has a universal data package for selective use by an unlimited number of receivers.

A fourth object of the present invention is to provide a data communication system that has multiple different data packets for selective receipt by an unlimited number of receivers having different functional objectives.

Another object of the present invention is to provide a data communication system and method which provide a facility whereby each of the receiver installations can monitor for the reliable receipt of data.

Still a further object of the present invention is to provide a data communication system and method which provide a facility, whereby data which has been missed by a respective receiver installation, can be retrieved.

BRIEF DESCRIPTION OF THE DRAWINGS

The foregoing and other objects, structures and teachings of the present invention will become more apparent from the following detailed description of the preferred embodiment for carrying out the invention as rendered below. In the description, reference will be made to the accompanying drawings, in which:

FIG. 2 is a block diagram illustrating the basic contents of the preferred data packet of the present invention.

FIG. 3 is a block diagram illustrating the further contents which can be contained in the preferred data packet of the present invention.

FIGS. 5A and B are flowchart portions illustrating the data packet reception and failure detection functions which are performed by the receiver means of the present invention.

DETAILED DESCRIPTION OF THE PREFERRED EMBODIMENT OF THE INVENTION

Figure 1:
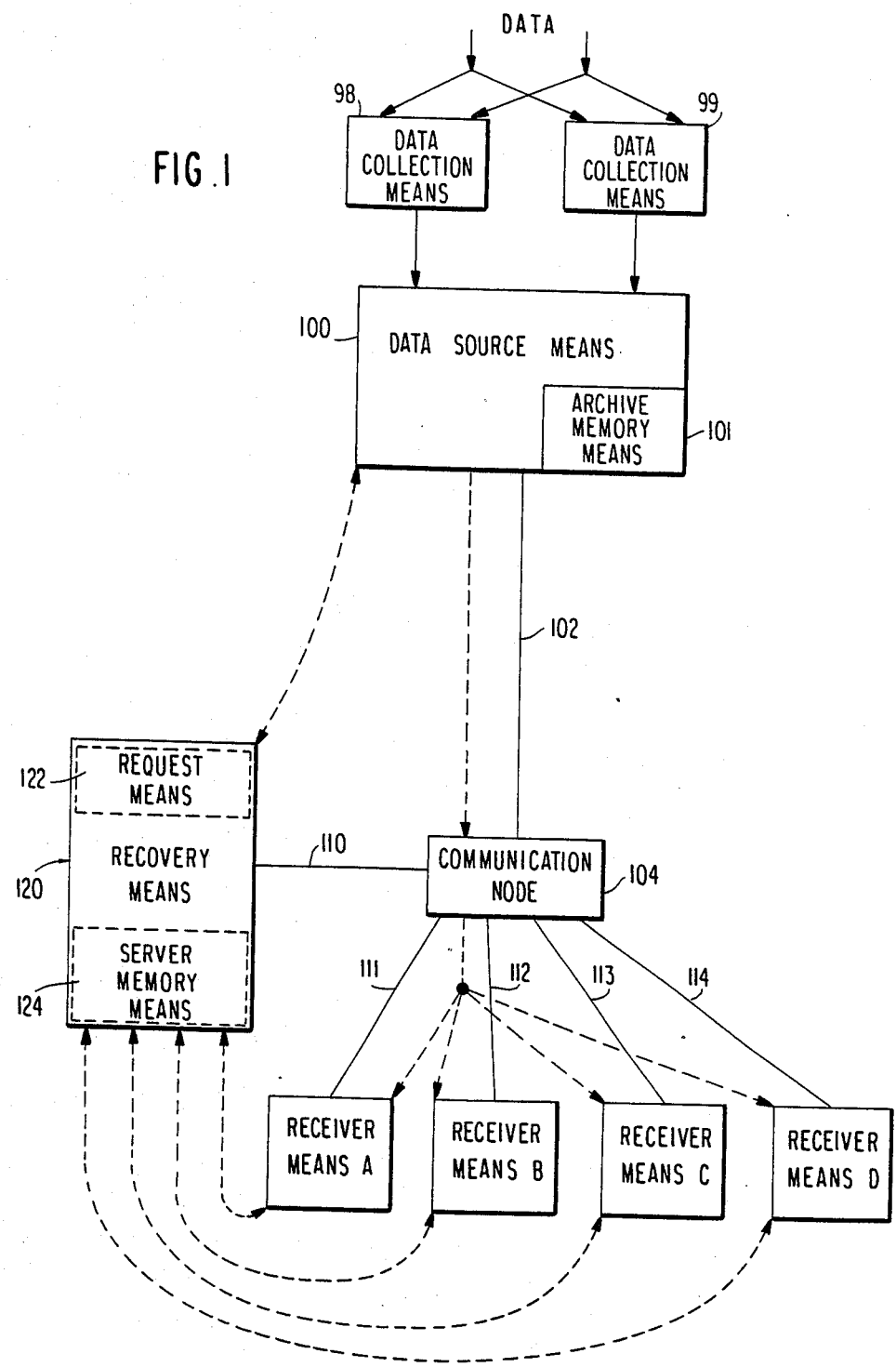
FIG. 1 is a block diagram illustrating a preferred embodiment of the data communication system of the present invention.

Before proceeding with a detailed description of the preferred embodiment, a number of specifics concerning the format of the discussion should be pointed out.

First, for the sake of simplicity of discussion, the detailed description and the drawings refer to only a small number of recovery means and receiver or workstation installations (to be described below); it should be understood that the invention is by no means limited to operation with just this small number of reception devices. In fact, the present invention is extremely attractive because it can be used to supply data to an unlimited number of reception devices.

Second, in an effort to add clarity to the explanation of the features and advantages of the present invention, the present invention is occasionally described in the context of exemplary application environments, it should be understood, however, that the invention is in no way meant to be limited to use within these application environments, as the examples used are in no way meant to be exhaustive.

Third, in order to provide a data communication system which allows swift data delivery to an unlimited number of receiver devices and a facility for checking the reliable receipt of data, the present invention utilizes a unique combination of a number of important data communication approaches. At several locations in the discussion to follow, a number of alternative data communication approaches are available to produce the same operation, function or result. Where a number of possible alternative approaches is available, each disadvantageous approach is discussed before the preferred approach, as the discussion may represent useful teachings to one skilled in the art, and more important, may serve to provide a greater appreciation of the advantages of the invention.

Finally, in developing the present invention, the inventors were successful in a conscious effort to develop a data communication system having the above-desired requirements, while at the same time, being implementable on the majority of data communication hardware devices which are in existence today, i.e., the data communications system of the present invention is hardware or platform independent and, therefore, can be implemented on the vast majority of existing hardware installations by an appropriate change in the system programming. Since the data communication system of the present invention is platform independent, the important aspects of the invention will be generically described with appropriate references to exemplary hardware devices when they are known. Whenever appropriate, reference will be made to FIGS. 1-9 illustrating block and flow chart diagrams of the preferred embodiment of the present invention.

An important feature enabling the present invention to provide swift data delivery is the utilization of a "multicast" data delivery approach. For the purposes of this application, the term "multicast" is defined as the sending of information from one-source-to-many, but not necessarily all, receiver devices connected to a communications network. One inherent requirement in utilizing a "multicast" data delivery approach is that data must be able to be collected at a single or small number of data sources from which all data is to be transmitted.

The delivery of data from a single source is preferred and advantageous in that a single data source means 100 is able to maintain control (i.e., does not have to share the transmission time or bandwidth) of the data communication network. In other systems which transmit data from a plurality of data sources, unnecessary data delay is introduced as the respective sources fight for control of the communication network (via handshaking, etc.) before transmitting their data onto the communications network. In the preferred embodiment illustrated in FIG. 1, there are shown data collection means 98 and 99 which collect relevant data, and supply the data to the single data source means 100. It should be understood that the data collection means 98 and 99 could each represent any well known data collection devices, for example, IBM PCs with appropriate communication facilities.

A second feature of the present invention, which allows swift data delivery to an unlimited number of remote receivers while introducing minimum data delay, concerns a unique approach to the the job of providing selected data to each of the respective receivers. Rather than having a single central device which performs all of the data management and selective channeling routines and which results in cumulative data delays, the present invention uses an approach whereby all available data is transmitted to all of the receivers on a communication network, and each of the respective receivers is delegated the task of selecting out the data it needs.

The selecting-at-the-point-of-receipt approach is advantageous, in that none of the receivers experiences data delay caused by other devices receiving data on the data communication system. Instead, only slight data delay is introduced at the point of receipt as each receiver makes a copy of all the data available along the communication network and then performs respective selecting functions to select out the particular data that it needs.

One disadvantage in using the selecting-at-the-point-of-receipt approach is that, instead of having and incurring the cost of a single central processing device to perform all the selecting routines (as in the previously described approaches), there is now the need to have a powerful selecting and processing facility at each of the respective receiver installations. Fortunately in this age of tremendous electronics and computer advances, the cost of powerful processing devices (e.g., microprocessors, personal computers) has dropped to a level where use of these devices is both feasible, and in many cases, already in operation at existing receiver installations. Examples of appropriate receiver devices would include personal computers, mainframe computers, or any other microprocessor based system.

In addition to providing swift data delivery, the present invention also provides for a data guarantee. A tremendous number of conditions can interrupt data delivery to any of the receivers, for example, an interrupted link in the communication system can isolate one or more of the respective receivers. Thus, another design goal of the present invention is to provide a data communication system which includes facilities whereby each receiver can determine whether all data has been received.

In order to provide the above data guarantee, the present invention utilizes a data packet sequencing and monitoring routine. The discussion of this routine begins with important functions which are performed at the point of data transmission.

Figure 4:
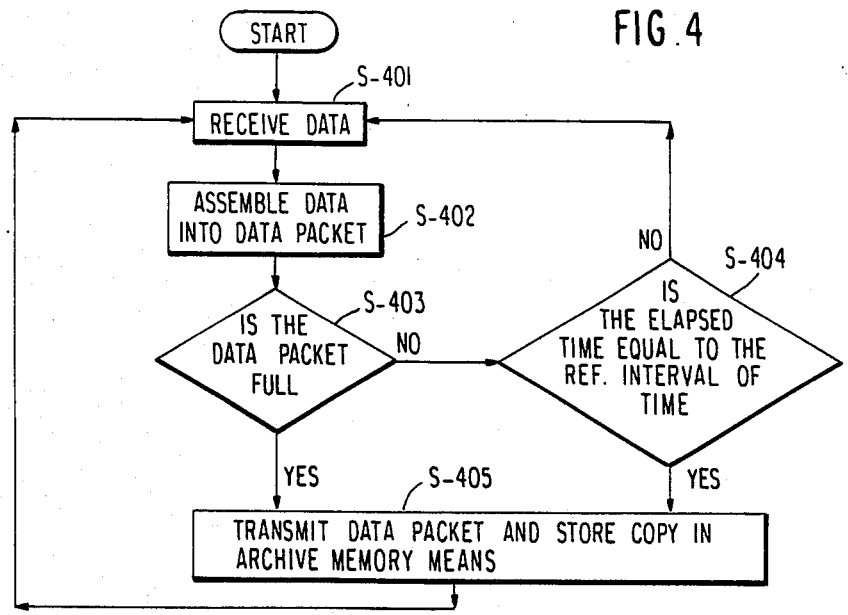
FIG. 4 is a flowchart illustrating the data packet transmission function which is performed by the data source means of the present invention.

As collected data arrives at the data source (S-401; FIG. 4), it is continually broken up by the data source means 100 and packaged (S-402) in the form of data packets (to be described below). As respective data packets become full, they are immediately transmitted onto the communications network (S-403, 405), thus resulting in a consecutive stream of data packets.

In order to provide the necessary data packet sequencing routine, each respective data packet is packaged to contain data representing data packet sequencing data in addition to data corresponding to an information field. The data packet sequencing data can be of any type of data (e.g., time stamp, consecutive sequence numbers, etc.), as long as it can be used by a remote device to track consecutive data packets to see whether the data packets as a whole represent a complete data packet sequence. In the preferred embodiment of the present invention, the data packet sequencing data would correspond to consecutive data packet sequencing numbers (e.g., data packet 0000, data packet 0001, etc). FIG. 2 is a block diagram illustration of the most fundamental data packet containing only data packet sequencing data and an information field. In contrast, the block diagram of FIG. 3 illustrates examples of other useful data (to be described below) which can be packaged into a data packet.

Figure 9:
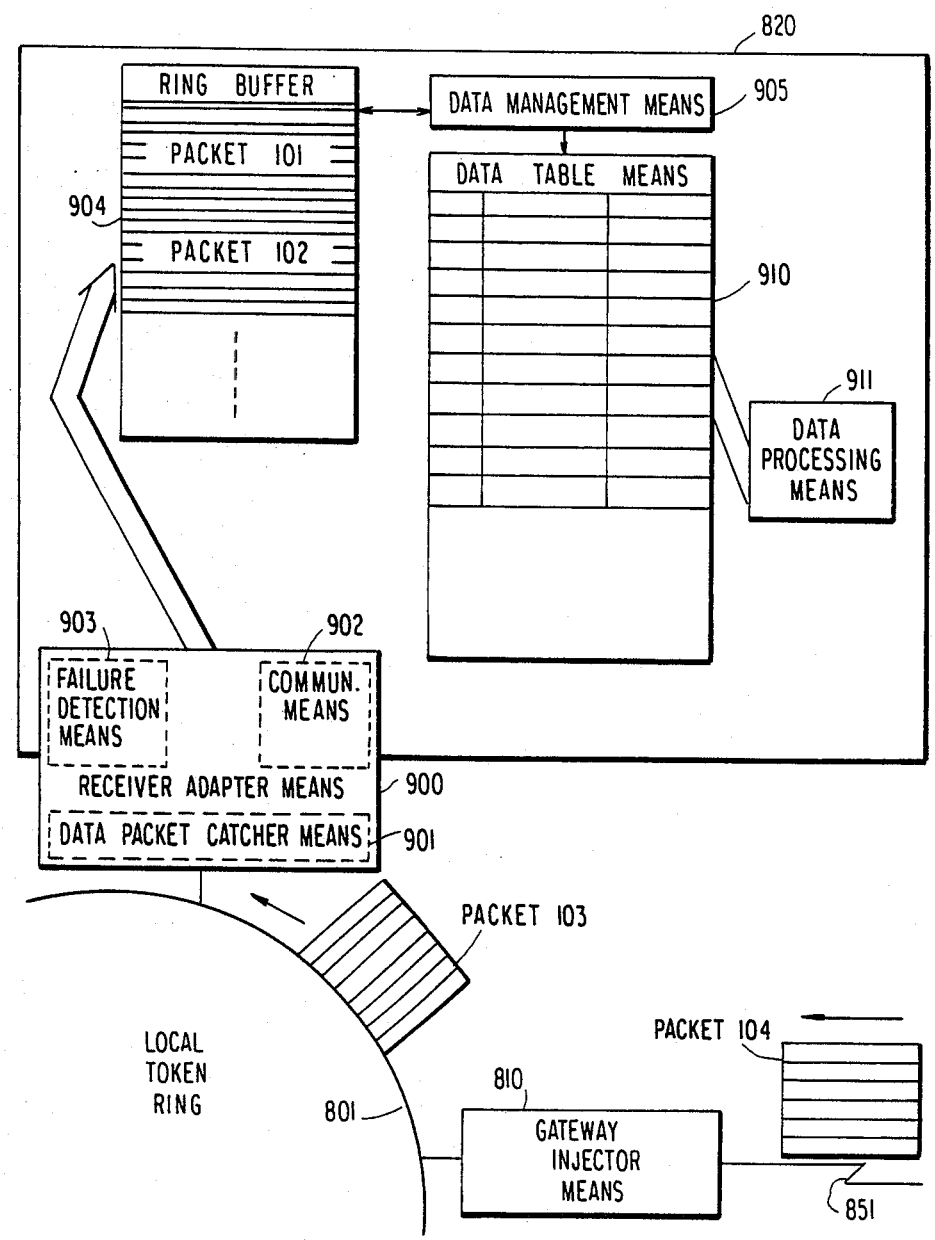
FIG. 9 is a block diagram illustrating the gateway injector means and receiver means portions of the embodiment of FIG. 8.

In order to make use of the data packet sequencing data to insure a data guarantee, each receiver includes a failure detection means (903; FIG. 9) which continually monitors incoming data packet sequencing data to check whether all consecutive data packets in the sequence have been received (see the flowchart of FIG. 5B). If a data packet is received without the next consecutive sequencing data, the respective receiver immediately knows that there has been a failure in reliable data receipt. In an example utilizing the preferred consecutive data packet sequencing numbers, if a receiver receives a data packet with an advanced sequencing number, rather than the expected next consecutive sequence number, the receiver will immediately know that data has not been received.

In order to provide a true guarantee of the reliable receipt of data, the above data-packet-sequencing-and-monitoring and sending-data-packets-only-when-full operations are not enough.

There may exist times or circumstances in some application environments where data activity becomes low and there is an exorbitant amount of time before a data packet becomes full. A prime business-world example would include data concerning the New York or London Stock Exchange activities at midnight as opposed to stock activities during prime stock trading hours. The above possibility leads to disadvantages in several respects.

The sending-data-packets-only-when-full approach is disadvantageous in a first respect, in that, data in a partially full data packet may become dated (e.g., stock pricing and/or availability may change) if an excessive amount of time occurs before transmission. The approach is disadvantageous in a second respect, in that, if a communication link failure were to occur to isolate a respective receiver, that receiver may continue to operate under the assumption that it has received the most recent data packet in the sequence, and the lack of incoming data packets is due to the lack of data activity. This potential is unacceptable in many applications where the prompt determination of a data-source-to-receiver communication failure is critical (e.g., radar applications).

In order to avoid the above disadvantages and to provide a higher degree of system and data guarantee, the present invention further incorporates a data packet "heartbeat" approach.

In the data packet "heartbeat" approach, the data communications system is given a "heartbeat" or "pulse" which represents the minimum frequency at which data packets will be sent. In addition to data packets being transmitted immediately when full, non-full data packets are also transmitted at every occurrence of a "reference" interval of time (S-404). Note that, as data packets may become full at a much greater frequency than the "reference" interval of time, the "heartbeat" or "pulse" represents a minimum frequency at which the data packets will be sent.

The data packet transmission function of the data source means 100 can be summarized and described with reference to the flowchart of FIG. 4. The data source means receives data (S-401) and assembles the data into data packets (S-402). The data source means 100 continually asks whether the data packet is full (S-403), and if so, the data packet is immediately transmitted (S-405) and a copy is stored in an archive memory means (to be described ahead). If the data packet is not full (S-403), the data source means 100 asks (S-404) whether the elapsed time is equal to a reference interval of time (to be described ahead). If yes, the data packet is immediately transmitted and a copy is stored in an archive memory means (S-405). If no, the data source means continues to perform steps S-401-S-404.

In order to implement the above approach, the "heartbeat" of the system or the "reference" interval of time can be defined in a number of different ways.

As a first example, the "heartbeat" can be defined by a "periodic" interval of ti me (e.g., like a periodic clock), whereby respective data packets are sent at at least every occurrence of the "periodic" interval of time. At the receiving end, the respective receivers expect the receipt of respective data packets at every occurrence of this "periodic" interval of time FIGS. 5A-B are flow chart illustrations showing the basic data packet reception and failure detection functions, i.e., the functions performed by the respective receiver means A-D.

This first possible definition of the "heartbeat" is disadvantageous, in that there is a possiblity that the data communication system might be transmitting more data packets than are actually needed to provide a data guarantee. More specifically, situations may occur where data packets become full and are transmitted at times which are immediately prior to the periodic interval of tiem. If a "periodic" data packet is sent immediately thereafter, despite providing the "heartbeat" function, the "periodic" data packet in these situations represent a waste as the data packet may contain zero data, and the respective receivers have just received an indication that the communications system was OK (i.e., the immediately preceding data packet).

A second definition of the system's heartbeat represents the preferred approach. In this second definition, the "heartbeat" is defined at the occurrence of a "predetermined" or "elapsed" interval of time, as measured from the transmission of the immediately preceding data packet. In the preferred embodiment utilizing this approach, every transmission of a respective data packet beings the "heartbeat" clock running anew. Even if a respective data packet is not full, the data packet is transmitted if a "predetermined" amount of time has elapsed since the transmission of the immediately preceding data packet. (See S-404; FIG.4). At the receiving end, each respective receiver utilizes the receipt of a data packet as a reference with which to measure time in monitoring for the receipt of the next preceding data packet, i.e., the next data packet should be received before or at the lapse of the "predetermined" interval of time. (See FIG. 5.) Although other reference points can be used to measure elapsed time, the measurement of "elapsed" time since receipt of the immediately preceding data packet represents the preferred approach. As an example pf a less preferred approach, the "heartbeat" of the system can be made adjustble by having each data packet contain data corresponding to the value of the current "heartbeat" value or maximum amount of time which should occur before the next data packet is received.

The "heartbeat" approach offers advantages in several respects. First, existing data is now sent at at least the occurrence of the "reference" interval of time such that, the data will not be unnecessarily delayed and become outdated. In a second, more important advantage, respective receivers are now able to monitor for the receipt of a respective data packet at at least a minimum frequency defined by the "reference" interval of time. If a respective data packet is not received at each occurrence of this "reference" interval of time, a respective receiver will immediately know that there has been a failure in the reliable receipt of data.

In determining the "reference" (i.e., "periodic" or "predetermined") time parameter for a particular application, the immediately above advantages provide insight into the determination of an appropriate interval of time. In order to avoid spoiled or outdated data, the value chosen for the "reference" time parameter should not exceed a maximumn "ripened data time", which represents the maximum time within which data should be transmitted by the data source before it becomes valueless and outdated. In determining this maximum time, it should be understood that the appropriate amount of tie for a "ripened data time" may vary considerably between different application environments, and also, may vary considerably within an application environment. As an example of widely varying data requirements, a stock trading house might demand less than a second data delay while a point-of-sale inventory data base change distribution might tolerate a 30 second delay, and in contrast to the above two times, a radar application might demand less than a 30 millisecond data delay. As a result of the foregoing, it should be apparent that the maximum "ripened data time" which is ultimately chosen should satisfy the time requirements of the most demanding receiver in the system.

In addition to the above-discussed advantages, the present invention is also advantageous in that, the use of a "heartbeat" additionally provides a means whereby receivers can also monitor for the occurrence of a major system failure. If a respective receiver continues to operate without the receipt of data packets for an extended period of time, at some point, an assumption can be made that there has been a critical failure in the data communication system. In order to implement this additional "system failure" function, a predetermination must be made as to an appropriate "system failure detection time", i.e., the amount of time after which a receiver will assume that there has been an ongoing and critical failure in the data communication system. A critical difference which affects the determination of the "system failure detection time" as opposed to the "reference" interval of time (for defining the heartbeat) should be pointed out.

The "heartbeat" or "reference" time value is a global time parameter which is universally applied throughout the entire communication system. The "system failure detection time" value, on the other hand, is a local time parameter which is applied at any one of the respective receiver installations. This can be further explained as follows. While the data communication system requires that the "heartbeat" be universal such that each of the respective receivers can monitor for respective data failure problems, there is no need for a universal "system failure detection time." As a result, a different "system failure detection time" can be set for each of the respective receivers.

In determining an appropriate "system failure detection time", it should be noted that different receivers within the same data communication system may have widely varying requirements. As an example, one stock trading company might demand to know of a critical system failure within 30 seconds, while a different stock trading company might be willing to tolerate 10 minutes. As a general rule, the "system failure detection time" should attempt to give the data communication system a reasonable length of time within which to recover, while at the same time, the length of time should not exceed a maximum time after which there is a possibility that the continued operation of the receiver will result in damaging results.

At this point, the data communication system and method described thus far will be summarized with reference to FIGS. 1–5.

Data is collected by data collection means 98 and 99 and is forwarded to data source means 100 (S-401). The data source means 100 assembles the data into respective data packets (S-402), each having data corresponding to a data packet sequencing number and an information field. In order to provide a means to check for data guarantee, data packets are transmitted from the data source means 100 anytime a respective data packet becomes full (S-403, 405), or if not full, at the occurrence of a predetermined interval of time (S-404, 405).

Once the data source means performs the above functions, the transmitted data packet becomes available along the data communication network 102, 104, 110–114. It should be noted that each of the communication links 102, 110–114 represent any well known communication link, for example, discrete wire connections, electromagnetic transmission, infrared, satellite transmission, etc. Furthermore, the communication node 104 represents any well known node device which will provide the necessary connection and transition between the communication link 102 and the respective communication links 110–114. As a specific example, the communication node 104 can be a gateway injector which is part of a Local Area Network (LAN) which encompasses the communication node 104 and the communication links 110–114.

The data packet reception and failure detection functions performed by the receivers or workstations of the present invention can be summarized and described with reference to the flowcharts of FIGS. 5A–B.

At the receiving, end each of the receiver means A–D continually monitors the data communication network (S-501) for a data packet, and continually asks whether a data packet has been received (S-502). If a data packet has not been received, the receiver asks (S-504) whether time is in excess of the reference interval of time. If not, the reception function is returned to a step S-501. If time is in excess of the reference interest of time (S-504), the receiver asks whether time is in excess of the "system failure detection time" (S-505). If yes, the receiver flags a critical failure in the data communication system (S-507). If time is not in excess of the system failure detection time, the receiver flags (S-506) a failure in the reliable receipt of a data packet returns to the step of S-501. If a data packet has been received at a step S-502, the receiver inserts (S-503) the data packet into a ring buffer (to be described ahead), and then asks (S-508) whether the data packet sequence data is equal to: (1) the data packet sequence data of a data packet recovery request; or, (2) the next consecutive data packet sequence data in the sequence. If yes, the receiver returns to the step S-501. Alternately, if the answer is no, the receiver flags (S-506) a failure in the reliable receipt of a data packet, before returning to a step S-501.

All that has been described thus far with regard to data guarantee, is a data communication system which can flag a failure in the reliable receipt of a data packet (S-506). While in some application environments there may be no interest in the recovery of a missing data packet (e.g., radar), in other applications, such recovery is desirable (e.g., recovery of all missing data packets in order to maintain an accurate history of particular stock trading transactions). The discussion now turns to additional features of the present invention which can be used to provide a data recovery guarantee.

Figure 5D:
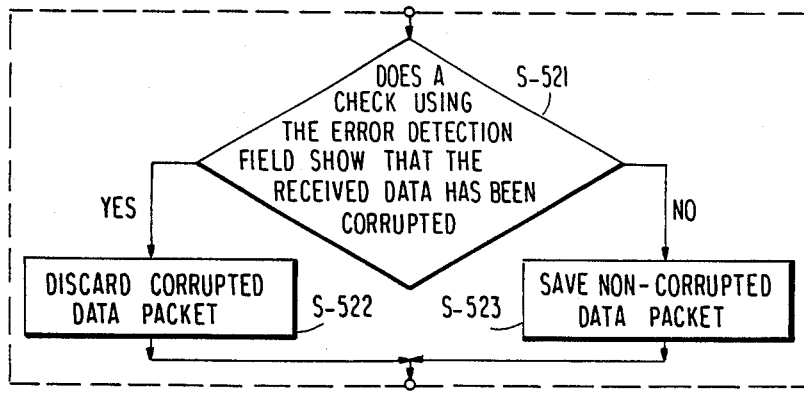
FIG. 5D is a substitute flowchart portion illustrating an error detection field function which can be included in the flowchart of FIG. 5A
Figure 5E:
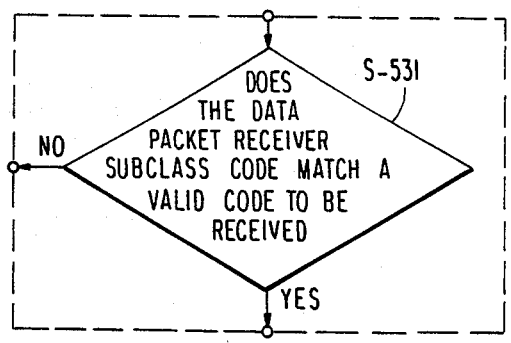
FIG. 5E is a substitute flowchart portion illustrating a receiver subclass code function which can be included in the flowchart of FIG. 5A.
Figure 5C:
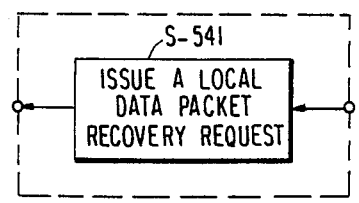
FIG. 5C is a substitute flowchart portion illustrating a data packet recovery request function which can be included in the flowchart of FIG. 5B.

FIG. 5C is a flowchart portion illustrating a data packet recovery request step which can be substituted into the dashed portion 540 of FIG. 5B, such that a receiver can issue a data packet recovery request (S-541) after there has been a failure indicated in the reliable receipt of a data packet (S-506). The data packet recovery request is satisfied by additional components of the present invention. Before discussing these additional components, a brief discussion of the prior art approach gives insight into the advantages of the present approach.

One disadvantage leading to data delay in the previously described recovery approaches, was that every receiver could communicate with and interrupt the data source means from its data transmission function. As a result, valuable data source operating time was thus absorbed, and maximum data source operating time could not be devoted to the continuous transmission of data packets.

In order to avoid absorption of main communication medium resources and provide data recovery with minimum delay, the present invention incorporates an independent data recovery means or file server means 120 and limits communication with the data source means. Before a discussion of the data recovery means 120, it is useful to first describe the limitations which are imposed on the communication between devices in the system.

Shown in FIG. 1 are dashed "session" lines which represent logical paths where communication sessions can be conducted between respective devices within the system. The dashed "session" lines are illustrated with arrows which indicate whether the communication path is unidirectional (i.e., one-way) or bidirectional (i.e., two-way). It should be noted at this time that the logical session lines do not necessarily represent actual physical lines, as all of the communication functions can performed using the existing communication network 102, 104, 110–114, or any other well known communication scheme (e.g., infrared, satellite transmission, etc.)

In viewing the "session" lines, it should be noted that the receivers A–D can only receive direct communication sessions from the data source means (i.e., unidirectional), and cannot directly communicate with the data source means 100 to request a recovery function. Instead, the receivers A–D must use an appropriate "session" line to direct a recovery request to the recovery means 120. As a result, the preferred embodiment avoids the data source operating time disadvantages mentioned above.

The features and operation used by the recovery means 120 in providing the recovery function will now be described.

In a manner similar to the receiver means A–D, the recovery means continually monitors the data communications network 102, 104, 110–114 for the availability of data packets. (Unless otherwise indicated, the recovery means 120 operates with the same data packet reception and failure detection function as illustrated in FIGS. 5A-B.)

Upon receipt of a data packet, the recovery means 120 stores a copy in a server memory means 124 which has sufficient memory storage space for storing a number of the most current data packets which have been received. Any well known memory device can serve as the server memory means 124, for example, in a preferred embodiment, the server memory means 124 would represent a ring buffer. It should be noted that, within memory device limitations, the ring buffer can selected to be any size, to store any number of the most recent data packets. If the ring buffer provided is of sufficient size to store a large number of data packets, chances are that the recovery means 120 will be able to perform the recovery function without disturbing the operation of the data source means 100.

In performing its recovery function (see FIG. 6), the recovery or file server means 120 continually monitors (S-601) the respective session lines from the receiver means A–D to see (S-602) whether there has been a data packet recovery request.

As a sidenote regarding the data packet recovery request, the present invention described thus far is particularly advantageous in terms of providing an immediate determination as to the information to be contained in the data packet recovery request. If a respective receiver performs its data packet sequence monitoring and failure detection functions and makes a determination that a data packet sequence number has been missed, the receiver can conveniently request recovery of that particular data packet, i.e., by specifying the missed data packet sequence number in the data packet recovery request. Thus, in effect, further delay beyond a receiver's data packet monitoring function is avoided, and the affected receiver can issue an immediate recovery request.

If the recovery means 120 receives a request for a particular data packet, it will extract the data packet sequence data from the request (S-603) and attempt to obtain a copy of the data packet from the server memory means 124 to satisfy the request (S-607). If a copy of the requested data packet is contained in the server memory means 124, a copy is obtained and is sent (S-611) to the requesting receiver either through the existing data communication network 104, 110–114, through the bidirectional "session" line, or through any other well known data communication or rebroadcast scheme. Whichever method is used to satisfy the request, care must be taken such that there is no interference between the data packet recovery and the normal data packet transmissions on the data communication system.

The above use of the server memory means 124 to provide copies of requested data packets may not be enough. If the memory size of the server memory means 124 is small and/or a large amount of time is allowed to pass before attempting to satisfy a request, the server memory means 124 may no longer contain the requested data packet, i.e., the copy of the requested data packet may have been dumped from the server memory means 124 to make room for a more recent data packet. Furthermore, as the recoverymeans 120 receives the copies of the data packets from the communication network 102, 104, 110–114, there exists a possibility that the recovery means 120 might also experience a failure in the reliable receipt of a data packet. In such a case, the recoverymeans 120 as described thus far would not be able to satisfy a request for the data packet which has been missed.

In order to obtain a copy of the requested data packet in any of the above events, the preferred embodiment of the recovery means 120 also contains request means 122.

Upon a determination that a copy of the requested data packet cannot be obtained from the server memory means 124 or has been missed, the request means 122 issues a request to obtain a copy from an alternative device (S-608). The alternative device can be any other device in the system, as long as the alternative device normally retains copies of the data packets.

As a first approach, a request via an appropriate "session" lines may be issued to any of the receiver means A–D which normally retains copies of the data packets. The alternative copy of the requested data packet can then be returned to the recovery means 120 through the use of the "session" lines, the communication network 104, 110–114, or any other well known communication method. The advantage of this approach is that, the data source means 100 is still not involved in the recovery operation, and therefore, all of the data source operating time adn communication network bandwidth can be dedicated to normal transmission of data packets. On the other hand, this approach is disadvantaged in that, there is a possibility that the alternative device also might not have a copy of the requested data packet, resulting in a need for a further request, and therefore, data delay.

In a second approach, a request (S-610) via an appropriate "session" line may be issued to the data source means 100. In order for the data source means 100 to be able to perform the recovery function in addition to transmitting data packets, the data source means 100 also stores a copy of every data packet transmitted in an archive memory means 101. This approach is advantageous in that, there is certainty that the data source means will always contain a copy of the data packet which has been requested.

Figure 6:
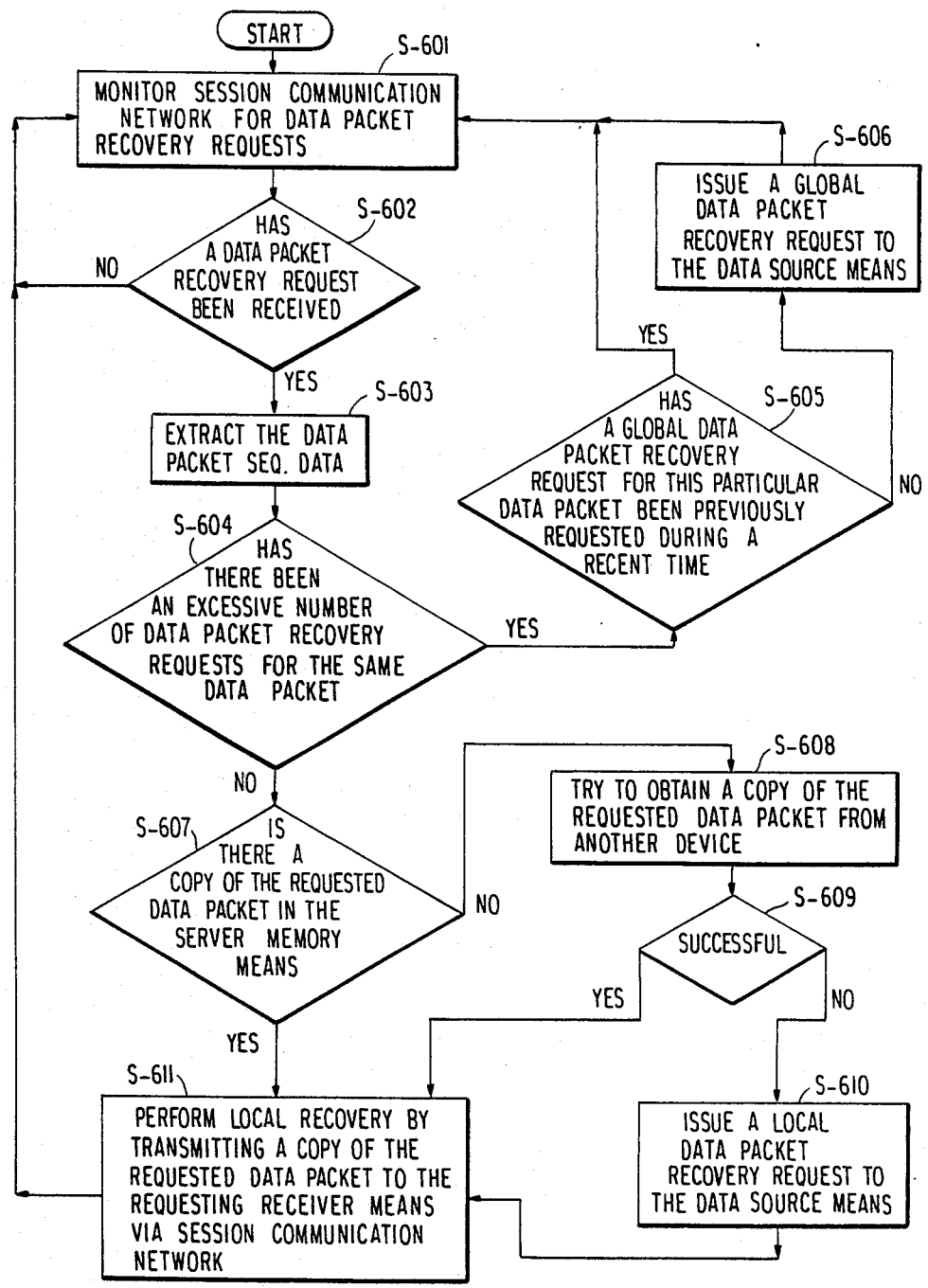
FIG. 6 is a flowchart illustrating a data packet recovery function which is performed by the recovery means of the present invention.

In order to make use of the respective benefits in each of the above approaches, the approaches can be combined as illustrated in the flowchart of FIG. 6. After determining (S-607) that a requested data packet is not available via the server memory means, the recovery means attempts (S-608) to obtain a copy of the requested data packet from another device (i.e., one of receivers A–D). This, in effect, is an attempt to first obtain a copy of the requested data packet without disturbing the operation of the data source means 100. This step can be repeated any number of times with a number of default devices in an attempt to obtain a copy from an alternative device. If the attempt is successful (S-609), the recovery means 120 performs the local recovery (S-611) and returns to a step S-601. Alternatively, if the recovery means is unable (S-609) to obtain a copy from an alternative device, the recovery means issues (S-610) a recovery request to the data source means 100 which is sure to have a copy of the data packet.

Before leaving the above discussion of the combination of the two approaches, it should be noted that the operation of the request means 122 as illustrated in the bottom portion of the flowchart of FIG. 6 represents one possible methodology, i.e., certain functions can be deleted or replaced as desired.

Figure 7:
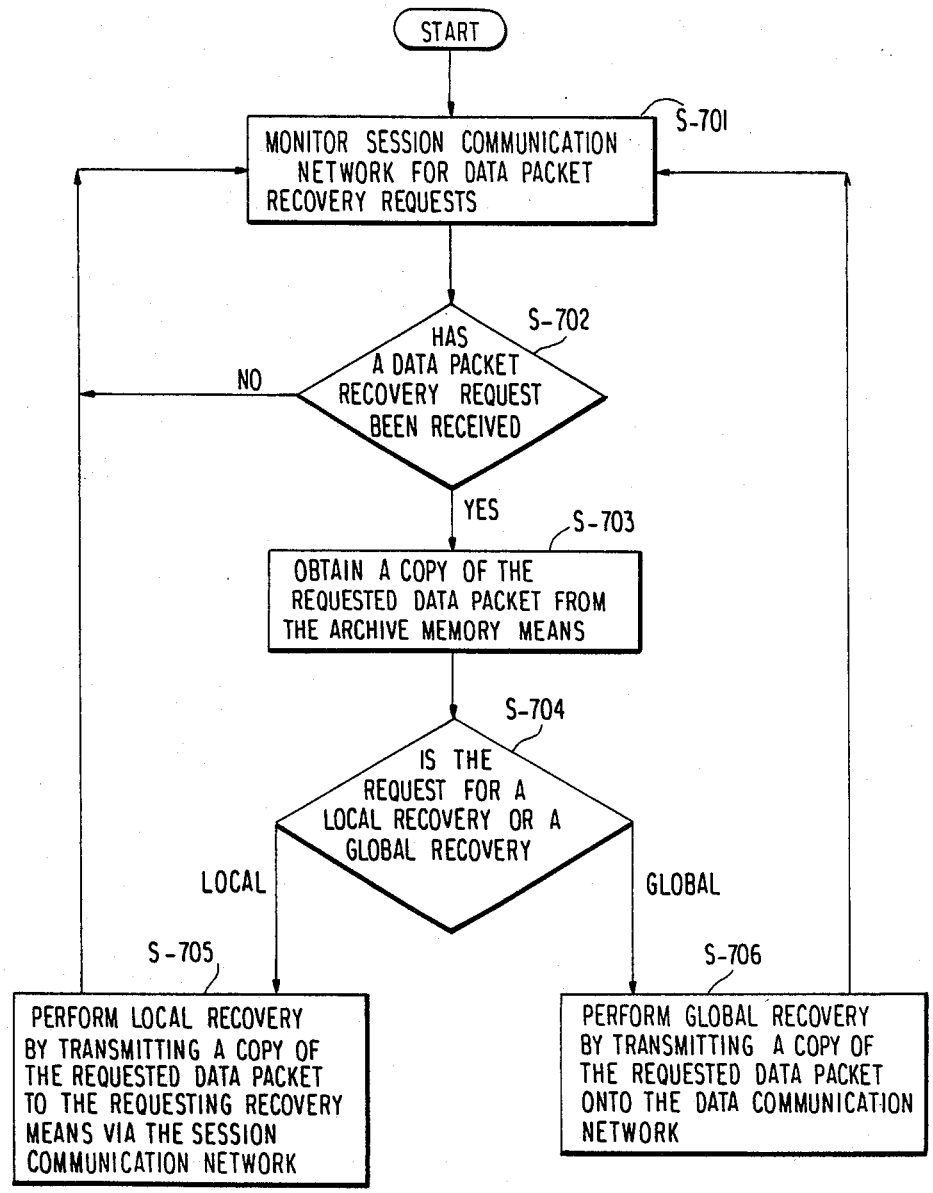
FIG. 7 is a flowchart illustrating a data packet recovery function which is performed by the data source means of the present invention.

In performing a data packet recovery functions, the data source means follows the basic operations illustrated in the flowchart of FIG. 7. In essence, the data source means 100 continually monitors (S-701) the "session" line for a data packet recovery request, and upon receipt of such a request (S-702), a copy of the requested data packet is obtained from the archive memory means 101 (S-703).

The disadvantage of the data source recovery approach provides insight into the appropriate data communication path which the data source means should use to satisfy the recovery request. If the data source means satisfies the request by retransmitting the data packet using the data communication network 102, 104, 110–114, the approach is disadvantageous in that, important communication medium resources (i.e., transmission bandwidth or transmission time) are being absorbed by the use of the communications medium to retransmit requested data packets. Rather than being able to devote a maximum amount of the communication medium resources to support a continuous transmission of updated data, a percentage must be dedicated to the recovery routine. As the number of data packet recovery requests to the data source means 100 increases, more and more of the communication medium is used, resulting in a proportional increase in data delay.

As a result of the foregoing, it can be seen that the use of the data communication network 102, 104, 110–114 should normally be avoided in satisfying a data packet recovery request. Instead, the data source means 100 should perform a "local" recovery (S-705) by transmitting a copy of the requested data packet to the requesting recovery means 120 via the use of the "session" communication link, or any other well known alternative communication method.

Despite the above general rule, there exists a situation where it is more efficient for the data source means to satisfy a data packet recovery request using the data communication network.

There exists a possibility that there could be a temporary failure in data communication system which results in the simultaneous isolation of a large number of receiver installations. This simultaneous isolation of a large number of receiver installations would result in the recovery means being bombarded with a large number of data packet recovery requests for the same data packet, i.e., a request from each of the respective receivers. As an unlimited number of receiver devices can be utilized with the present invention, it can easily be seen that a recovery means 120 could become overrun with the number of data packet recovery requests. Even if the recovery means 120 had the ability to store all the requests, a cumulative data delay would be suffered by each respective receiver while the recovery means 120 satisfied the requests in the order of receipt. At some point, the cumulative data delays which are experienced would become intolerable.

In this situation, it is more efficient to have the recovery means 120 issue and specify a "global" data packet recovery request. As can be seen in the flowchart of FIG. 6, the recovery means could also monitor the number of requests it has received for the same data packet (S-604). If the number of requests exceeds a predetermined number and a request for that particular data packet has not been recently sent (S-605), the recovery means 120 sends the data source means 100 a "global" data packet recovery request (S-706). Although a little data communicaton resources (i.e., operating time or bandwidth) is consumed in the recovery operation, this approach is advantageous in that, data packet recovery by all of the receivers is almost instantaneous.

Figure 8:
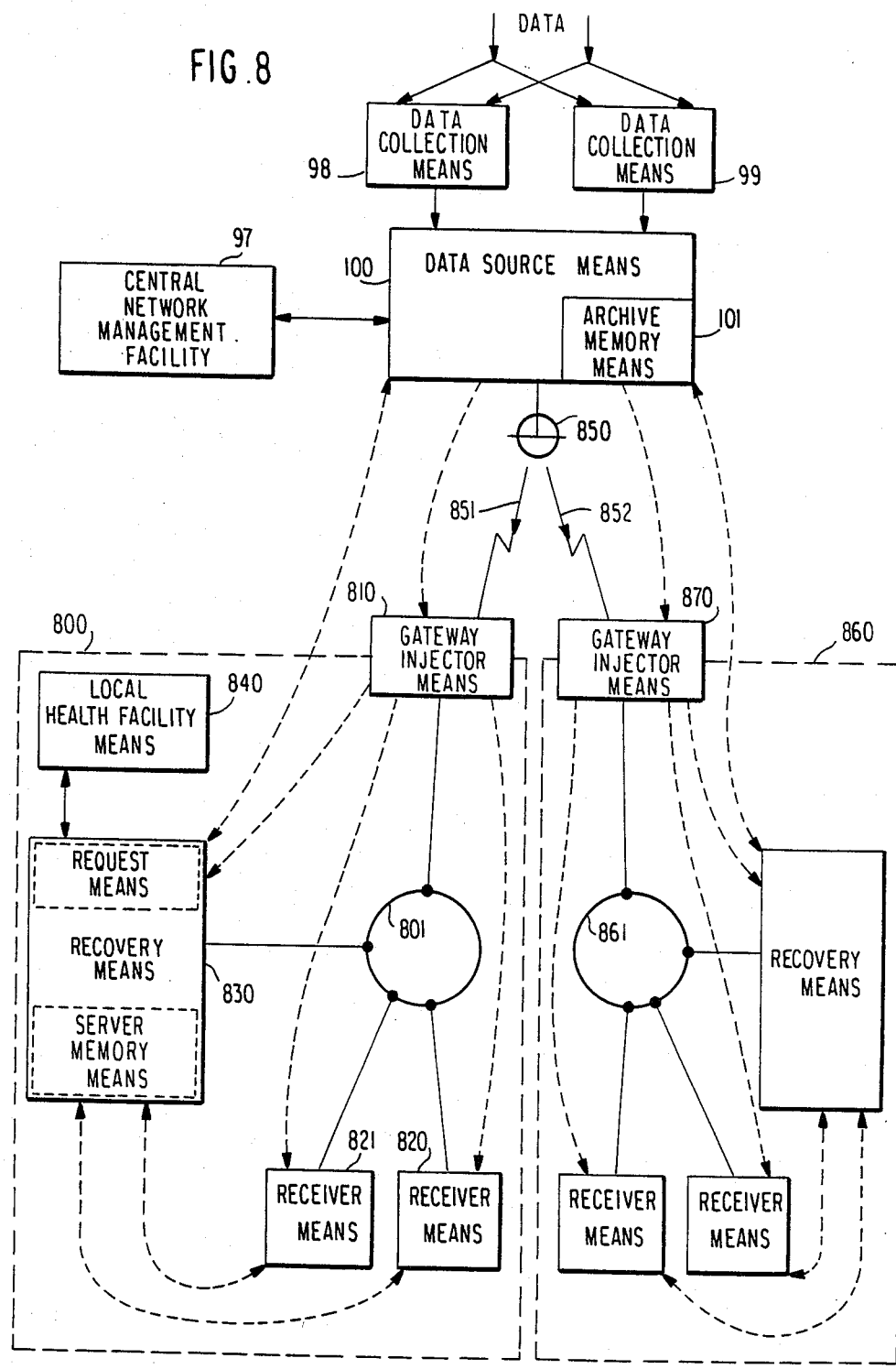
FIG. 8 is a block diagram illustrating a preferred wide-area distribution and local token ring embodiment of the data communication system of the present invention.

The discussion now turns a second preferred embodiment which represents a more complex and wide area distribution embodiment of the data communication system of the present invention. In FIGS. 8 an d9, structural elements which are the same as those in FIGS. 1–7 are designated by the same reference numerals or characters, and detailed descriptions thereof are omitted.

In FIG. 8, the operation of the data collection means 98, 99 and the data source means 100 is the same as was described with reference to FIG. 1. However, the data source means conducts transmissions of the updated data packets using the wide area distribution device 850 emitting wide area transmissions 851, 852. The wide area distribution device 850 and wide area transmissions 851, 852 can represent any well known wide area distribution method, for example, FM sideband transmissions, microwave transmissions, token ring distributions, and satellite transmissions.

At the points of data receipt, the wide area transmissions of the data packets are received by the local area network 800 and local area network 860, through the use of the gateway injector means 810 and 870, respectively. By using satellite transmissions, the local area network 800 could easily represent a local data communication network in New York, while the local area network 860 could easily represent a local data communication network in London.

Although the remainder of the discussion will be directed toward the operation of the local area network 800, a parallel discussion can be made as to the operation of the local area network 860.

The main purpose of the gateway injection means 810 is to receive transmission of data packets from the data source means, and provide the required transition between the wide area communication link and a local area network. As one specific example, in FIGS. 8 and 9, the gateway injector means 810 is to provide the processing of data packets such that they can make the transition between the medium of the wide area transmission 851 and the token ring medium 801 of the local area network 800. The gateway injector means 810 can represent any well known device having the ability to provide the transition of data packets from one medium to another. In a preferred embodiment, the nature of the gateway injector means 810 would be such that, any communication which is conducted between the gateway injector means 810 and the token ring 801 follows the protocol of the IEEE 802.2 and 802.5 standards. In FIG. 9, there are shown a data packet 104 which is arriving at the gateway injector means from the wide area transmission 851, and a data packet 103 which has been processed and injected onto the token ring 801 by the gateway injector means 810.

At this point, it should be pointed out that an inherent character in some token ring systems can be used to allow the data communication system to have multiple data packet streams which are directed only to specific groups of receivers, i.e., the token ring systems already have a built-in "functional addressing" ability which allows the user to program devices along the token ring such that they will only accept certain classes of data packets. As an example, in using an IBM token ring system, the user can program the respective devices along the token ring to accept any of twelve (12) different classes of data packets. (Note that this situation provides an illustration of the "multicast" operation of the present invention, i.e., the transmission of data from one-source-to-many, but not necessarily all receiver devices connected to a communications network.)

FIG. 9 provides further illustrations as to the preferred operations and construction of a typical receiver or workstation means 820. To provide many of the important features discussed previously, the receiver means 820 contains a receiver adapter means 900. The receiver adapter means 900 contains a data packet catcher means 901 which can represent any well known device providing connection to the token ring 801, for example, any processor such as an IBM PC performing the steps S-501, 502 in FIG. 5A. In a preferred embodiment, the nature of the data packet catcher means 901 would be such that, any communication which is conducted between the receiver means 820 and the token ring 801 follows the protocol of the IEEE 802.2 and 802.5 standards. The data packet catcher means 901 can be designed to provide a number of important functions.

First, and most important, the catcher means 901 should be designed to continually monitor the token ring 801 for the availability of a data packet (S-501). If a data packet is available, the data packet catcher means should immediately make a copy and provide it to the failure detection or "negative acknowledgement" (NACK) means 903. The purpose of the failure detection means 903 is to check for failure in the reliable receipt of consecutive data packets (FIG. 5B) by monitoring the data packet sequencing data (S-508) and for the receipt of a respective data packet at at least a minimum frequency defined bvy the "reference" interval of time (S-504). If the failure detection means 903 determines that there has been a failure in the reliable receipt of a data packet (S-506), the failure detection means 903 can issue a local data packet recovery request (S-541).

Another important function, which the data packet catcher means 901 can provide, is to conduct an operation which provides a further check as to data guarantee. Even though a respective receiver may appear at first sight to receive the transmission of every data packet, the data within a respective data packet may have been corrupted, e.g., an individual data bit within the packet may have been changed by a burst of noise. In order to provide a further check for a greater data guarantee, the further method steps of FIG. 5D can be substituted for the blocked portion 520 in FIG. 5A. In a first method step (S-521), the data packet catcher means 901 can ask whether a check of the data using the error detection field (FIG. 3) reveals that the received data has been corrupted. Any of a number of well known approaches are available for checking the integrity of the data in a data packet, and in many cases, commercially available token ring adapter devices already incorporate one or more of these data checking facilities. A preferred embodiment of the present invention would utilize a token ring system which has the facility to perform a 32-bit cyclic redundancy check using the error detection field.

In returning to the description of FIG. 5D, if the method step of S-521 shows that the received data has been corrupted, the receiver discards the corrupted data packet (S-522). Alternatively, if the data has not been corrupted, the receiver maintains the data packet (S-523).

In addition to the data packet catcher means 901 and the failure detection means 903, the receiver adapter means 900 can also include a communication means 902 which can be used to provide, conduct and monitor the "sessions" which are conducted with the recovery means 830. This fun;ction would mainly include, but would not be limited to, "sessions" used to send a data packet recovery request to the recovery means which functions in the manner described in FIG. 6. In providing another function, the communication means 902 could monitor for and answer requests for receiver health reports (to be described ahead).

As to additional components of the receiver means, once a non-corrupted data packet has been received by the data packet catcher means 901, it is stored (S-503) in the ring buffer means 904. The ring buffer device is a data memory device which has sufficient memory storage area to store a number of the data packets which have been recently received, for example, the ring buffer 904 might be able to store the latest 50 data packets. As to the storage order in the ring buffer means, the data packets may be stored in the order of data packet sequence number, or strictly in the order of receipt. If the data packets are stored in the data packet sequence order and a respective data packet is missed, the operation of the data packet catcher means 901 and the failure detection means 903 (as functionally described in FIG. 5B) can be programmed to reserve memory space in the ring buffer means 904 until a recovery data packet is received.

As the data communication system of the present invention provides a continuous steam of data packets and the memory space in the ring buffer means 904 is limited, it should be remembered that the copy of a respective data packet in the ring buffer is only available for a limited amount of time. Furthermore, it should be remembered that the data stored in the ring buffer is a pile of unsorted and raw data representing all available data from the data source means 100. As a result of the foregoing, it can be seen that the receiver means 820 has a further need for a means to access the needed data from the ring buffer while it is still available.

In order to include the data accessing function, the preferred receiver means embodiment of the present invention further includes data management means 905 (e.g., a data base management system), and data table storage means 910 which contains the selected data in a table. In essence, the data management means 905 should be of a construction or programming which allows it to access the data in the ring buffer means 904, and extract all the data which is needed to perform the receivers intended function. The data management means 905 can use the accessed data to update the table of data which is stored in the data table means 910. The data stored and maintained in the data table means 910 can be arranged in any convenient order, e.g., numerically, alphabetically, etc.

It should be noted that if data is transmitted in an unorganized manner, the data accessing and selecting function may introduce some data delay, i.e., excessive data delay is introduced before the data is available at the updated data table 910. There is at least one approach which can be utilized to minimize this data delay.

Such an approach is based upon the adoption of a system-wide or universal collecting approach. In this universal collecting approach, the data contained in each data packet is arranged by the data source means 100 in some known collating sequence, e.g. alphabetically, numerically, etc. In the light of the known collating sequence, the accessing and data management operations of the data management means 905 can be greatly speeded up.

As a final step in the receiver means functions, a data processing means 911 can be included to use the updated data from the data table means to perform the receiver means intended function. Rather than having the data processing means continually perform its intended function, note that an embodiment is envisioned wherein the data processing means 911 remains idle unless and until it receives a signal from the data table means that some data of interest has changed. As an example, the receiver's data management means or data table means can include a change assessment program which can be used to trigger the running of a program which then utilizes the changed data in satisfying the functional objectives of the receiver. The running of the program can be triggered every time data is changed, or in another embodiment, can be triggered after the data changes which have occurred becomes greater than a predetermined threshold value (i.e., after a certain number of data changes has occurred, or, after the value of the data change is greater than a predetermined value).

In addition to the general ideas and conceptual arrangements of the present invention as described above, a few last words will be used to describe several more convenient arrangements which can be utilized with the present invention.

Anytime there is a transmission of a "heartbeat" data packet, chances are that there is still more information space available in the data packet. This free space can be utilized to provide further attractive functions to the data communication system of the present invention. The data packet of FIG. 3 is utilized to illustrate one example of a number of uses which can be made of extra information space.

In the first row of FIG. 3 there is shown a "receiver subclass code" which allows the segregation of multiple streams of data packets to different groups of receivers. Use of this approach is particularly attractive in applications where there are large groups of receivers which have only an interest in a subset of the data. This would serve to avoid unnecessary data manipulation, and hence, additional data delay. In order to utilize this "receiver subclass code" to reject data packets which are not of interest avoid unnecessary data selection and manipulation, the flowchart portion of FIG. 5E can be substituted for the dashed portion 530 in FIG. 5A. As a result, the receiver will ask whether the "receiver subclass code" matches a valid code to be received. If yes, the receiver continues with the step S-503. If not, the receiver ignores the data packet and returns to the step S-501.

Also shown in the first row of the data packet of FIG. 3, is an "error detection field" having a use which was previously described with reference to FIG. 5D.

In the second row of the data packet of FIG. 3, there can be seen a block corresponding to a data packet sequence number. Also shown in the first row are blocks corresponding to time stamp data and system status data.

The time stamp, which typically is the time at which the data packet is sent, provides useful time information which can be used for a number of different purposes. For example, the time information is useful in helping a respective receiver determine the relative length of the data delay which has been introduced as the data packet travels through the data communication system.

In addition to the time stamp associated with the data packet, another time stamp can be associated with each data field. These time stamps provide a way to order the data fields chronologically on the basis of the time of data field creation.

The system status data provides useful information as to the current status of the data communication system. As will be seen ahead, extra information space in a data packet can also be used by the data source means to sent a personal message to any of the respective receivers. A good use of a personal message would be a request for the receiver means to report its current status back to a central network management facility 97. As to an answer, each of the receiver means has the ability using a communication means 902 to route an answer back to the data source means 100 using the previously described "session" lines or rebroadcast on the local network to a local health facility 840 which reports the collective receivers' status to a central network management information focal point which executes a network management program, e.g., the IBM Netview program. In many applications, respective receiver installations have a need to know the status of other receivers on the system. To provide such information, the data source means 100 can first send an individual message query to each of the respective receiver installations. After a reasonable length of time has been given for all of the receivers to answer the request, the data source means can use the system status block to report the status throughout the system.

On the second, third and fourth rows of the data packet of FIG. 3, there can be seen a data information field having data corresponding to three respective stock transactions. It should be remembered that this application is meant only to be exemplary as there are a tremendous amount of layout variations which can be used.

On the fifth row, there can be seen a block representing data corresponding to statistical information data. The statistical calculations to obtain this information could be performed by the data source means 100 or some other remote device, e.g., the central network management facility 97. As a result of this specific example, it should be apparent that any other convenient calculation or service can be provided, as long as there is excess space in some of the data packets.

On the final illustrated line in FIG. 3, there are shown blocks corresponding to message information. The first block entitled "message ID" can be a unique set of numbers or characters such that a personal message can be directed to a respective receiver. The second block contains the time of the message, while the last block contains the message itself. In reviewing the message function, it is useful to note that a message can be sent between any two or more devices in the data communication system. If a message is initiated by any other device than the data source menas, the request is forwarded to the data source means by having the message follow the appropriate communication path along the "session" lines. Receipt and transmission of message information is typically managed at each of the respective receivers by a communication means 902.

As a result of the foregoing, there has been described a unique data communication system and method which provides swift transmissoin of data to an unlimited number of remote receiver installations, while at the same time, providing several routines which result in various degrees of a data guarantee.

While the invention has been particularly shown and described with reference to the preferred embodiment thereof, it will be understood by those skilled in the art that various changes in form and details of the device and the method may be made therein without departing from the spirit and scope of the invention.

What is claimed is:

1. A reliable, high performance data communication system comprising:
   data source means for assembling data into data packets and transmitting respective said data packets as they become full with a predetermined amount of data, or if not full, at an occurrence of a reference interval of time, each of said data packets having data corresponding to data packet sequencing data and an information field; and
   a plurality of receiver means for receiving said transmitted data packets, each said receiver means having failure detection means for checking for failures in the reliable receipt of said data packets by monitoring:
   said data packet sequencing data; and
   for receipt of a respective data packet within each expiration of a period of time corresponding to said reference interval of time;
   whereby both receipt of a data packet having data packet sequencing data which does not match a next expected data packet sequencing data of a predetermined sequence, and also a failure to receiver a respective data packet within an expiration of a period of time corresponding to said reference interval of time, are indicative of a failure in a reliable receipt of said data packets.

2. A data communication system as claimed in claim 1, wherein said reference interval of time corresponds to a lapse of a predetermined amount of time which is measured from a transmission of a preceding data packet.

3. A data communication system as claimed in claim 1, wherein each said receiver means can issue a request for a data packet, said communication system further comprising:
   recovery means for supplying a requested data packet to respective receiver means which issue a request for said requested data packet in response to a determination that there was a failure in a reliable receipt of a data packet.

4. A data communications system as claimed in claim 3, wherein said data packet sequencing data corresponds to a data packet sequencing number.

5. A data communications system as claimed in claim 4, wherein said respective receiver means identify a respective requested data packet by using said data packet sequencing number.

6. A data communications system as claimed in claim 3, wherein said recovery means comprises:

server memory means for receiving said data packets, and for storing copies of a predetermined number of most current data packets which have been transmitted; and request means, capable of communication with said data source means, for requesting retransmission of a particular data packet from said data source meansn in an event said recovery means is unable to satisfy a respective receiver's request for a particular data packet from said server memory means, in an event that more than a predetermined number of respective receivers issue a request for a same particular data packet.

7. A data communication system as claimed in claim 1, wherein each of said data packets additionally has data corresponding to error checking data, and wherein said receiver means performs a further check for the reliable receipt of said data packets using said error checking data.

8. A data communication system as claimed in claim 1, wherein said receiver means further includes:
buffer means for storing said data packets received from said data source means.

9. A data communication system as claimed in claim 8, wherein said receiver means further comprises:
data management means for selectively accessing data in said data packets stored in said buffer means.

10. A data communication system as claimed in claim 9, wherein said receiver means further comprises:
data processing means for processing and performing predetermined operations using said selected data, and means to trigger said processing and performing upon a detection of data of a predetermined type.

11. A data communication system as claimed in claim 1, wherein each of said data packets has data corresponding to time stamp data.

12. A data communication system as claimed in claim 1, wherein said information field of a respective data packet has a plurality of data items, each of said data items being comprised of data corresponding to a code field and a corresponding information field.

13. A data communication system as claimed in claim 1, wherein each said data packet contains a receiver subclass code to allow a plurality of independent packet streams.

14. A reliable, high performance data communication method comprising the steps of:
assembling data into data packets, each of said data packets having data corresponding to data packet sequencing data and an information field;
transmitting respective said data packets as they become full with a predetermined amount of data, or if not full, at an occurrence of a reference interval of time; and
receiving said transmitted data packets at a plurality of receiver means, and at each of said receiver means, checking for failures in a reliable receipt of said data packets by monitoring:
said data packet sequencing data; and
for receipt of a respective data packet within each expiration of a period of time corresponding to said reference interval of time;
whereby both receipt of a data packet having data packet sequencing data which does not match a next expected data packet sequencing data of a predetermined sequence, and also a failure to receive a respective data packet within an expiratoin of a period of time corresponding to said reference interval of time, are indicative of a failure in a reliable receipt of said data packets.

15. A data communication method as claimed in claim 14, wherein said reference interval of time corresponds to a lapse of a predetermined amount of time which is measured from a transmission of a preceding data packet.

16. A data communication method as claimed in claim 14, wherein each said receiver means can issue a request for a data packet, said communication method further comprising the step of:
supplying a copy of a requested data packet to respective receiver means which issue a request for said requested data packet in response to a determination that there was a failure in a reliable receipt of a data packet.

17. A data communications method as claimed in claim 16, wherein said data packet sequencing data corresponds to a data packet sequencing number.

18. A data communications method as claimed in claim 17, wherein said respective receivers identify a respective requested data packet by using said data packet sequencing number.

19. A data communications system as claimed in claim 16, wherein said supplying step is accomplished by:
receiving said data packets and storing, in a server memory means, copies of a predetermined number of most current data packets which have been transmitted;
if a copy is available in said server memory means, retrieving a copy of a requested respective data packet from said server memory means; and
in either an event said recovery means is unable to satisfy a respective receiver's request for a particular data packet from said server memory means, or in an event that more than a predetermined number of respective receivers issue a request for a same particular data packet, requesting retransmission of a particular data packet from said data source means; and
transmitting said particular data packet to said respective receiver means which issued a request for said requested data packet.

20. A data communication method as claimed in claim 14, wherein each of said data packets additionally has data corresponding to error checking data, and wherein said checking step includes a further check for the reliable receipt of said data packets using said error checking data.

21. A data communication method as claimed in claim 14, further including the step of:
storing said data packets received at said respective receiver means in a buffer means.

22. A data communication method as claimed in claim 21, further comprising the step of:
selectively accessing, at each said respective receiver means, data in said data packets stored in said buffer means.

23. A data communication method as claimed in claim 22, further comprising the step of:
processing and performing predetermined operations, at each said respective receiver means, using said selectively accessed data.

24. A data communication method as claimed in claim 14, wherein each of said data packets has data corresponding to time stamp data.

25. A data communication method as claimed in claim 14, wherein said information field of a respective data packet has a plurality of data items, each of said data items being comprised of data corresponding to a code field and a corresponding information field.

26. A relible, high performance data communication system comprising:
  data source means for assembling data into data packets and transmitting respective said data packets as they become full with a predetermined amount of data, or if not full, at an occurrence of a predetermined interval of time which is measured from the transmission of the preceding data packet, each of said data packets having data corresponding to data packet sequencing data and an information field;
  a plurality of receiver means for receiving said transmitted data packets, each said receiver means having failure detection means for checking for failures in the reliable receipt of said data packets by monitoring;
    said data packet sequencing data; and
    for receipt of a respective data packet within each expiration of a period of time corresponding to said predetermined interval of time;
  whereby both receipt of a data packet having data packet sequencing data which does not match a next expected data packet sequencing data of a predetermined sequence, and also a failure to receive a respective data packet within an expiration of a period of time corresponding to said reference interval of time, are indicative of a failure in a reliable receipt of said data packets, and each said receiver means can issue a request for a data packet; and
  recovery means for supplying a requested data packet to respective receiver means which issue a request for said requested data packet in response to determination that there was a failure in a reliable receipt of a data packet.

27. A reliable, high performance data communication method comprising the steps of:
  assembling data into data packets, each of said data packets having data corresponding to data packet sequencing data and an information field;
  transmitting respective said data packets as they become full with a predetermined amount of data, or if not full, at an occurrence of a predetermined interval of time which is measured from a transmission of a preceding data packet;
  receiving said transmitted data packets at a plurality of receiving means, and at each respective said receiver means, checking for failures in a reliable receipt of said data packets by monitoring:
    said data packet sequencing data; and
    for receipt of a respective data packet within each expiration of a period of time corresponding to said predetermined interval of time;
  whereby both receipt of a data packet having data packet sequencing data which does not match a next expected data packet sequencing data of a predetermined sequence, and also a failure to receive a respective data packet within an expiration of a period of time corresponding to said reference interval of time, both being indicative of a failure in a reliable receipt of said data packets, and each said receiver means can issue a request for a data packet; and
  supplying a copy of a requested data packet to respective receiver means which issue a request for said requested data packet in response to a determination that there was a failure in a reliable receipt of a data packet.

28. A reliable, high performance data communication system comprising:
  a communications network interconnecting a data source means with a file server means and a plurality of receiver means;
  said data source means periodically broadcasting packets of information to said file server means and said plurality of receiver means;
  each of said packets including a packet sequence number, a time stamp, and a plurality of information fields, each information field including a unique code field and a corresponding data field;
  a ring buffer in each respective one of receiver means in said plurality of receiver means for storing a plurality of packets received over said communications network;
  data management means for performing a code selection function in each said receiver means for selecting from said plurality of information fields in each packet stored in said ring buffer, data fields corresponding to selected ones of said unique codes;
  an ordered data table means in each said receiver means for storing in an ordered sequence said selected data resulting from performance of said code selection function;
  data processing means in each receiver means for utilizing said selected data in said ordered data table means;
  said file server means storing all of said packets received from said communications network; and
  negative acknowledgement means in each said receiver means for anticipating a receipt of said periodic packets from said data source means and detecting an omission of an anticipated receipt of a data packet, and in response thereto, generating a request for retransmission to said file server means, which performs retransmission through either a broadcast or via a session type connection;
  whereby a high performance, reliable data communication from said data source means to said receiver means is established.

29. The data communication system of claim 28, wherein said file server means performs a negative acknowledgement assessment function for determining whether negative acknowledgements from a subplurality of said plurality of receiver means is likely to indicate a failure of broadcasting of a packet from said data source means to said receiver means; and
  wherein said file server means further comprises request means for establishing a communications session between said file server means and said data source means in response to an indication from said negative acknowledgement assessment function, for accessing a packet of information from said data source means corresponding to said failed broadcast.

30. The data communication system of claim 28, wherein said data management means performs a change assessment function for accessing data stored in said ordered data table means, and determining whether changes in a value of said data, corresponding to a selected code, are greater than a predetermined threshold value;

said ordered data table means being responsive to said change assessment function for outputting new values of data identified as surpassing said threshold; and said data processing means being responsive to an output from said ordered data table means to execute tasks corresponding to said changed data which has surpassed said threshold value.

31. The data communication system of claim 28 wherein:

said periodic broadcast of said data packets by said data source means is based upon a reference interval of time wherein a next data packet is required to be broadcast at the end of said reference interval of time as measured from a broadcast of a most recent data packet;

whereby said data source does not fail to broadcast a data packet less frequently than once per said reference interval of time.

32. The data communication system of claim 28, wherein said communication network comprises a token ring local area network.

33. The data communication system of claim 28, wherein said negative acknowledgement means of respective receiver means issue said request for retransmission in response to a detection of an expiration of a reference interval of time as measured from receipt of a most recent packet.

34. The data communication system of claim 28, wherein said negative acknowledgement means of respective said receiver means issue said request for retransmission in response to a determination of a missing packet sequence number.

35. The data communication system of claim 28, wherein said negative acknowledgement means and said respective receiver means issue said request for retransmission in response to an absence of an anticipated periodic packet which has not been received from said data source means.

* * * * *